| United States Patent [19] | [11] Patent Number: 4,936,706 |
| Lüftenegger et al. | [45] Date of Patent: Jun. 26, 1990 |

[54] PROCESS FOR THE TREATMENT OF STOCKPILE MATERIAL, CONTAINERS FOR STOCKPILE MATERIAL, IN PARTICULAR FOR CARRYING OUT THIS PROCESS, AS WELL AS A RELEASABLE ROOF FOR CONTAINERS FOR STOCKPILE MATERIAL

[75] Inventors: Ferdinand Lüftenegger; Dietmar Aluta-Oltyan, both of Salzburg, Austria

[73] Assignee: Alpine Baugesellschaft m.b.H., Salzbug/Wals, Austria

[21] Appl. No.: 230,551

[22] Filed: Aug. 10, 1988

[30] Foreign Application Priority Data

Aug. 12, 1987 [AT] Austria ............................ A2032/87

[51] Int. Cl.⁵ ................................................ B09B 1/00
[52] U.S. Cl. ..................................... 405/128; 405/53;
405/129
[58] Field of Search ............. 405/128, 129, 52, 53–55,
405/270, 271

[56] References Cited

U.S. PATENT DOCUMENTS

| 3,586,624 | 6/1971 | Larson | 405/129 X |
| 3,732,697 | 5/1973 | Dickson | 405/129 |
| 4,166,709 | 9/1979 | Valiga | 405/128 |
| 4,252,462 | 2/1981 | Klingle et al. | 405/129 |
| 4,335,978 | 6/1982 | Mutch | 405/54 X |
| 4,352,601 | 10/1982 | Valiga et al. | 405/270 |
| 4,362,434 | 12/1982 | Valiga et al. | 405/53 X |
| 4,430,021 | 2/1984 | Wagner et al. | 405/129 |

Primary Examiner—Dennis L. Taylor
Attorney, Agent, or Firm—Beveridge, DeGrandi & Weilacher

[57] ABSTRACT

Proposed is a process for the treatment of stockpile material in which stockpile material is treated by means of liquids and/or gases in a stockpile material body at least essentially sealed all around; further a container for the long-term storage of stockpile material, with a casing resting on a base and a cover for the casing cavity, as well as a radial gradient drainage to the container bottom center, in which a first surface filter layer with drainage pipes and on top of this a first mineral sealing layer is disposed on the container bottom, the first surface filter layer and the sealing layer each covering the free surface of the container bottom, a bottom/side sealing apron whose lateral portion lightly abuts the casing abutting the sealing layer towards the top, a second filter layer with drainage pipes on which the stockpile material is stored being provided above and radially within the bottom/side sealing apron; as well as a releasable roof for cylindrical stockpile material containers with centrally charged circular conveyor for the stockpile material.

18 Claims, 4 Drawing Sheets

PROCESS FOR THE TREATMENT OF STOCKPILE MATERIAL, CONTAINERS FOR STOCKPILE MATERIAL, IN PARTICULAR FOR CARRYING OUT THIS PROCESS, AS WELL AS A RELEASABLE ROOF FOR CONTAINERS FOR STOCKPILE MATERIAL

BACKGROUND AND SUMMARY

The present invention relates to a process for the treatment of stockpile material, a special container for stockpile material, in particular for carrying out this process, as well as a special releasable roof with feeder belt and circular conveyor, also for stockpile material containers.

Unprotected stockpiles constitute an essential enviromental hazard and it has long been known that stockpiles ought to be sealingly enclosed and underpinned for the protection of surface and ground water, although this was frequently neglected up to now.

It was futher found that stockpile material of different orgins should not be stored indiscriminately, but instead separately, as many uncontrollable reactions might occur between the different fractions over extended storage periods. It is a well-known fact that this is hard to do and that the facilities therefor are seldom available.

The ultimate aim in each case is to obtain a stable state of the stockpile material in which it undergoes no further changes, and experience has shown that with mixed stockpile material, this state is not even reached after several decades, so that a control of the leakage water and disposal thereof would be necessary over these extended storage periods, but is not provided in many cases.

According to the invention, it is proposed not to leave the stockpile material bodies to themselves, but instead to actively influence the stockpile material so as to transform it to the intended stable state.

There have been many different attempts at the treatment of matter such as stored waste materials.

So, for instance, AT-PS No. 372 308 describes a process for the disposal of oily waste matter immiscible with water by adsorption on a solid substance (such as, for instance, powdered lime) and agitation with a liquid, environment-polluting waste material to form an aqueous sludge which then solidifies into a solid rock after the addition of cement.

A similar solidification by the addition of cement is described in EP-A No. 0 104 773 for liquid and semi-liquid organic waste material, for instance, activated sludge and primary sludge from sewage treatment plants. The solid product thus obtained is stored open as stockpile material or in ground for used as a fertilizer.

Processes for leaching soil formations to remove contaminants have also been proposed. So, for instance, EP-A 0 185 831 describes a continuous process wherein the soil is sludged with flushing water and thus extracted; the sludge withdraws in situ and the pollutant-carrying rinsing water is passed to a water treatment plant.

The extraction of soil formations in situ is described in EP-A No. 0 059 020 and EP-A No. 0 515 768. According to EP-A No. 0 059 020, the contaminated layer of soil is encircled by sealing walls driven down to a liquid-sealing layer of soil, and soil lances supplying flushing liquid are driven down to the desired depth in the encircled space. The soil lances are either pressure lances, with the liquid supplied flushing the contaminated areas from underneath, and the flushing liquid charged with contaminants being removed from the ground surface; or they are suction lances supplying the flushing liquid to the soil surface and sucking it off from undereath the contaminated soil area after it has penetrated the soil. EP-A No. 0 155 768 describes a similar process wherein a combined system of pressure lances and suction lances is introduced into a laterally encircled and underpinned soil area so that the flushing of the soil is effected in an essentially horizontal direction. The flushing liquid sucked off is purified and recycled.

EP-A No. 0 181 211 relates to the treatment of a subterranean contaminated soil formation in situ wherein an aqueous treatment medium is introduced, but does not have a flushing function becasue it is not sucked off, but inslead is left in situ. The treatment liquid is an aqueous solution with a content of hydrogen peroxide or hydrogen peroxide-forming substances (sodium perborate, sodium percarbonate and the like) and a hydratizable polymer which increases the vicosity of the treatment solution to such an extent that diffusion beyond the local treatment area is prevented.

According to the invention, it is proposed to carry out the treatment of stockpile material by means of liquids and/or gases in a stockpile material body which is at least essentially sealed off on all sides. This results in a closed system wherein there is no outside interference with the processes in the stockpile material on the one hand, and no loss to the outside and no influencing of the environment by these processes, on the other hand.

The stockpile material within the scope of the present specification is understood to include all storable materials of which at least medium-range storage is intended. This relates not only to pure waste matter, but also to matter in the form of secondary industrial products containing materials suitable for recovery. The process according to the invention is mainly characterized in that stockpile material is treated with liquids and/or gases, in particular flushed and/or leached, in a stockpile material body sealed at least essentially on all sides. The gas mainly used is air in order to accelerate aerobic or oxidation processes, and the liquid used is industrial water in the simplest case.

Of particular advantage is a reaction flushing in which reactive components are added to the flushing gas and/or flushing liquid for the concerted provocation of reactions and/or the concerted leaching of reaction products or components of stockpile material.

It may be covenient to circulate the treatment material so that it will not have to be freshly added and disposed of continuously. The cycle normally comprises at least one purification step, so that, valuable materials can be recovered. In some cases, however, it may suffice to simply repump the treatment medium in order to generate a flow in the stockpile material to prevent the migration of reactive components of the stockpile material by diffusion.

It is particularly convenient to maintain an oriented electrochemical diffusion flow in the stockpile body, the liquid in the stockpile body forming a primary element from electrolytes together with two different metal surfaces. This can be done by stationary or mobile means on the container for the stockpile material, for instance, by various linings or mobile tongs. The process may be accelerated by applying external voltage.

The leaching liquids and/or gases are purified in the conventional way and circulated, with the pollutants and valuable materials and/or their reaction products extracted being separated and recovered during purification according to conventional chemical or physical treatment processes. Examples for these are precipitation, complexing, ion exchange and electric processes such as electrophoresis and dialysis processes.

The simplest stockpiles not involving any particular building structures are the so-called deepness stockpiles in abandoned mines and suface stockpiles disposed in natural or artificial terrain depressions whose bottom and sides are sealed, for instance, with binding soil and/or foil against the ground water and which are scaled off on top and closed when they are filled up.

Possibilities of this type are not aviable to an adequate extent so that separate stockpile containers are now buil above or below the ground.

A special case of a stockpile basin which is merely sealed laterally and towards the bottom is disclosed in U.S. Pat. No. 4,335,978. The seal is made up of two shells and a pressurized liquid preventing the penetration of leakage water from the stockpile material through the inner shell into the intermediate space is provided between the inner and the outer shell.

Important for the cooperation with stockpile material containers enclosed on all sides is the so-called multibarrier principle which provides for a safety device in the form of multiple layers disposed between the stockpile material and the environment and surrounding the stockpile body on all sides, with a leakage water discharge being arranged in individual ones of these barrier layers, such as disclosed, for instance, in EP-A No. 0 130 773. DE-OS No. 33 03 067 (EP-A No. 0 187 874) decribes a storage site for waste material in which individual concrete containers are assembled honeycomblike into a container complex on an impermeable concrete base. The containers are filled underneath a protecting roof and then covered by a concrete cover. A filter is disposed underneath the concrete base and provided with drainage pipes. The entire structure is laterally enclosed by a protective wall of water-impermeable soil which is encircled by a drainage ditch provided with control means.

DE-OS No. 35 08 824 relates to a container with double casing whose lower part is formed as a bottom basin. The space between the sealing concrete shells of the double casing is filled with a layer of filler bodies incorporating a drainage system.

EP-A No. 0 204 895 relates to a cylindrical underground container for waste matter suitable for stockpiling which is covered by a mineral sealing layer after it is filled up. It consists of a double casing with central mansized shaft, the annular space between outer and casing being drained towards the mansized shaft via radial channels. A further drainage layer is provided between the outer casing and the soil, it is drained towards the mansized shaft, further liquid drainage via the mansized shaft can be provided in order to drain off liquid leaking downwards in the inner casing in the filling mass via bottom pipes disposed in the bottom plate.

The invention further relates to a container for the long-term storage of stockpile material, with a casing supported on a base and a cover for the casing cavity, in particular an annular container with central charge and central mansized shaft as well as radial gradient drainage towards the center of the container bottom such as it is known, for instance, from EP-A No. 0 204 895, although in contrast to this known embodiment, the invention provides for a sealing bottom plate.

WO No. 86/04943 relates a.o. to a bottom seal for stockpiles in which two sealing layers are spacially superimposed and optionally consist of plastic foil or mineral layers, with a control filter layer comprising two pipe systems arranged between them. The sealing layers are connected to one another in grid shape by sealing bulkheads between the cover layers. The one pipe system in the surface filter layer is used for the injection of sealing substances while the other pipe system at undamaged top sealing layer, serves as s control system. If the top sealing layer fails, the latter pipe may be used to inject sealing substances, as ventilation and drain for liquid leaking into the surface filter layer from above could not be evacuated in any other way.

Above the top sealing layer, there is a drainage layer with a built-in pipe system for the lateral discharge of liquid leaking downwards from the stockpile material.

It was found that this type of sealing is complicated and unreliable in particular in the event of failure of the top sealing layer, and is particularly unreliable as a bottom seal in a container. It was found that far better results are obtainable if the bottom of a stockpile material container is first provided with a first surface filter layer with drainage pipes, optional injection pipes, a mineral sealing layer and a bottom/side sealing apron are disposed on top of this in immediate succession, so that two directly adjacent seals are provided. The result of this is that, if a leackage spot in the upper seal, the bottom/side sealing apron, occurs, the mineral sealing layer (for instance clays) disposed underneath instantly swells up so that the leak is virtually instantly closed.

In comparison, the container according to the invention is mainly characterized in that a first surface filter layer with drainage pipes, and on top of this a first mineral sealing layer, in particular of argillaceous minerals, is arranged on the container bottom, optionally on top of a levelling layer to the base, with the first surface filter layer and the sealing layer each covering the free surface of the container bottom, and that a bottom/side sealing apron (skirt) whose lateral portion tightly abuts the casing, and optional container components such as shafts or the like are provided adjacent the sealing layer towards the top, and that a second surface filter layer with drainage pipes on which the stockpile material is stored, preferably under interposition of a porous protective layer for the second surface filter layer, is provided radially within the bottom/side sealing apron.

Further characterizing features of the container according to the invention which may be realized alone or in any given combination are the following:

(a) A radial mineral annular sealing layer, preferably supported by a supporting profile towards the stockpile material, is provided between the second surface filter layer, a optional protective layer, and the stockpile material, on the one hand, and the bottom/side sealing apron, on the other hand.

(b) The bottom/side sealing apron is made of elastic material, preferably of HDPE sheet, and has a expansion compensating zone in particular in the bottom/side transition area.

(c) A supporting layer permeable for gases and liquids, in particular a net or non-woven material, preferably of plastics, is provided between the first surface filter layer and the mineral sealing layer, between the bottom/side sealing apron and the second surface filter layer and/or between the second surface filter layer and the porous protective layer.

(d) The surface of the stored stockpile material is covered by a third surface filter layer with drainage pipes, with the radial mineral annular sealing layer preferably encompassing the third surface filter layer, and a second mineral sealing layer, in particular of argillaceous minerals, is disposed on top of the third surface filter layer.

(e) The second mineral sealing layer is covered on top by a fourth surface filter layer with drainage pipes slanting down to the container center.

(f) The fourth surface filter layer is covered on top by a cover plate, in particular of concrete, preferably provided with covered openings, the surface of the plate slanting down to the casing of the container and encompassing the casing.

(g) The cover plate is releasably supported in relation to the casing in order to accommodate volume changes in the stockpile material body, and is preferably provided with a radial inner rim resting on the second mineral sealing layer, with a bottom/side sealing apron tightly abutting the casing inside of the container and pulled up over the top of the casing, sealingly sliding along the plate.

(h) A cover/side sealing apron is pulled up laterally on the fourth surface filter layer between it and the surface of the second mineral sealing layer.

(j) A pulled-up portion of the cover/side sealing apron is sealingly slidable on the radial inner rim of the cover plate. (k) The soles of the first, second and/or fourth surface filter layers slant down to the container center.

(l) If the container is installed under ground, a further surface filter layer is provided between cover plate and surface covering material.

(m) The stockpile material is stored between a preferably corrugated, metal supporting layer, in particular of steel, facing the casing and a central, preferably corrugated, metal supporting layer, in particular of copper.

(n) Pipe systems for introducing and/or discharging liquid and/or gaseous media are provided in the first, second and/or third surface filter layers.

The invention further relates to the special embodiment of a releasable roof for cylindrical stockpile material containers with centrally charged circular conveyor for the stockpile material. Roofs of this type, which are dismantled after filling a container and placed onto a new container for filling this, are known, for instance, from EP-A No. 0204895.

According to this publication, the underground containers described therein are closed after filling in a manner known per se with a mineral covering to protect them from liquids penetrating from the top.

The releasable roof according to the invention is mainly characterized in that is is provided with a radially extending, central box carrier indirectly supported on the container casing, with trusses resting on the box carrier at right angles to it, each other end of the trusses being indirectly supported on the container casing, with a feeder belt with central discharge onto the circular conveyor provided within the box carrier for the stockpile material to be introduced.

The circular conveyor can be provided in a conventional manner with an overhead (travelling) crane and, according to a further characterizing feature of the invention, has a preferably longitudinally adjustable discharge belt. In particular, the discharge bell taking the stockpile material over from the feeder belt is formed as a tier belt with adjustable tiers.

The objects of the invention are described by means of an exemplary embodiment in which they are combined, under reference to the accompanying drawing wherein.

Figure 1:
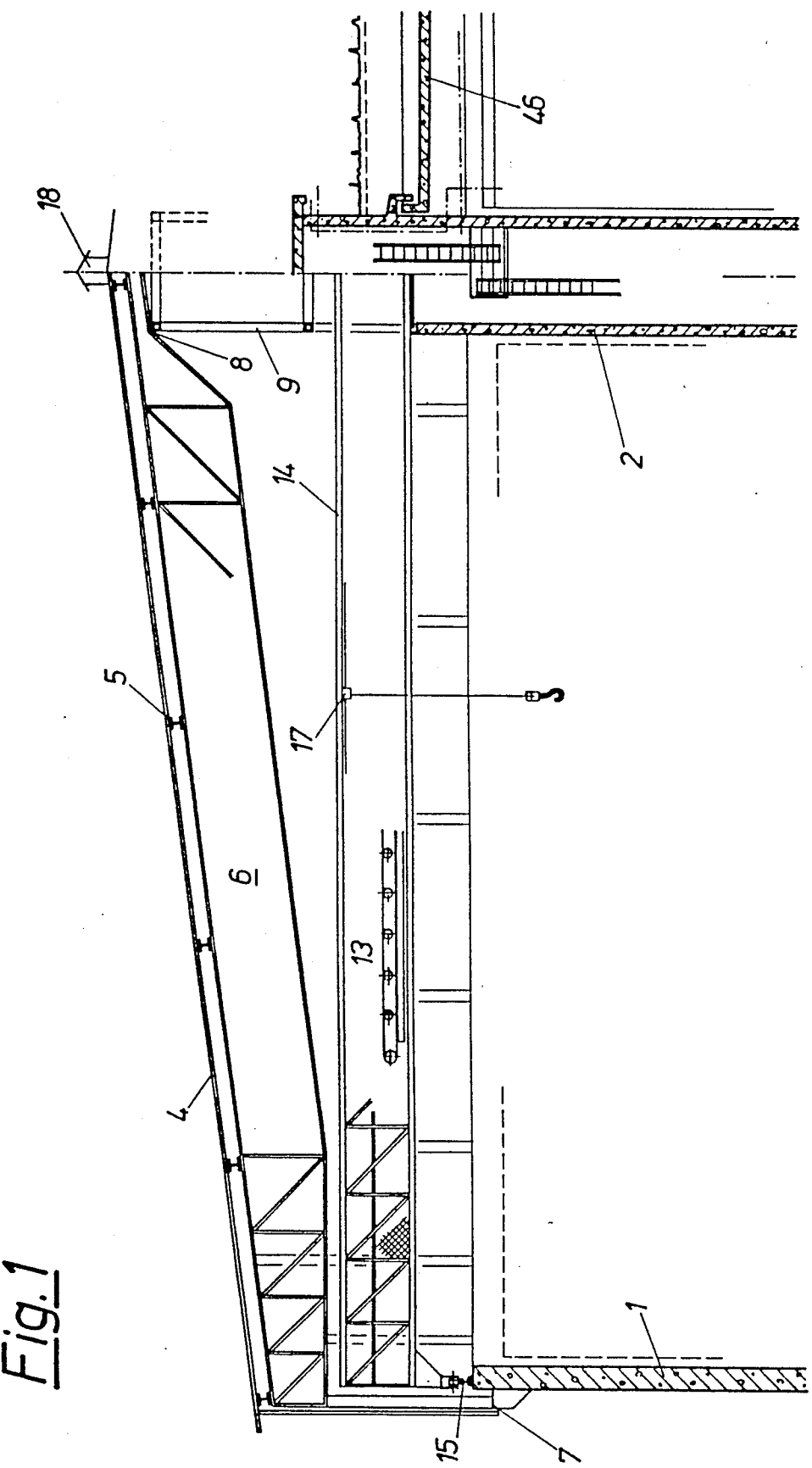
FIG. 1 shows a partial sectional view of an underground stockpile material container, in the left-hand area during filling, and in the right-hand area after dismantling of the roof and applying the surface seal.
Figure 2:
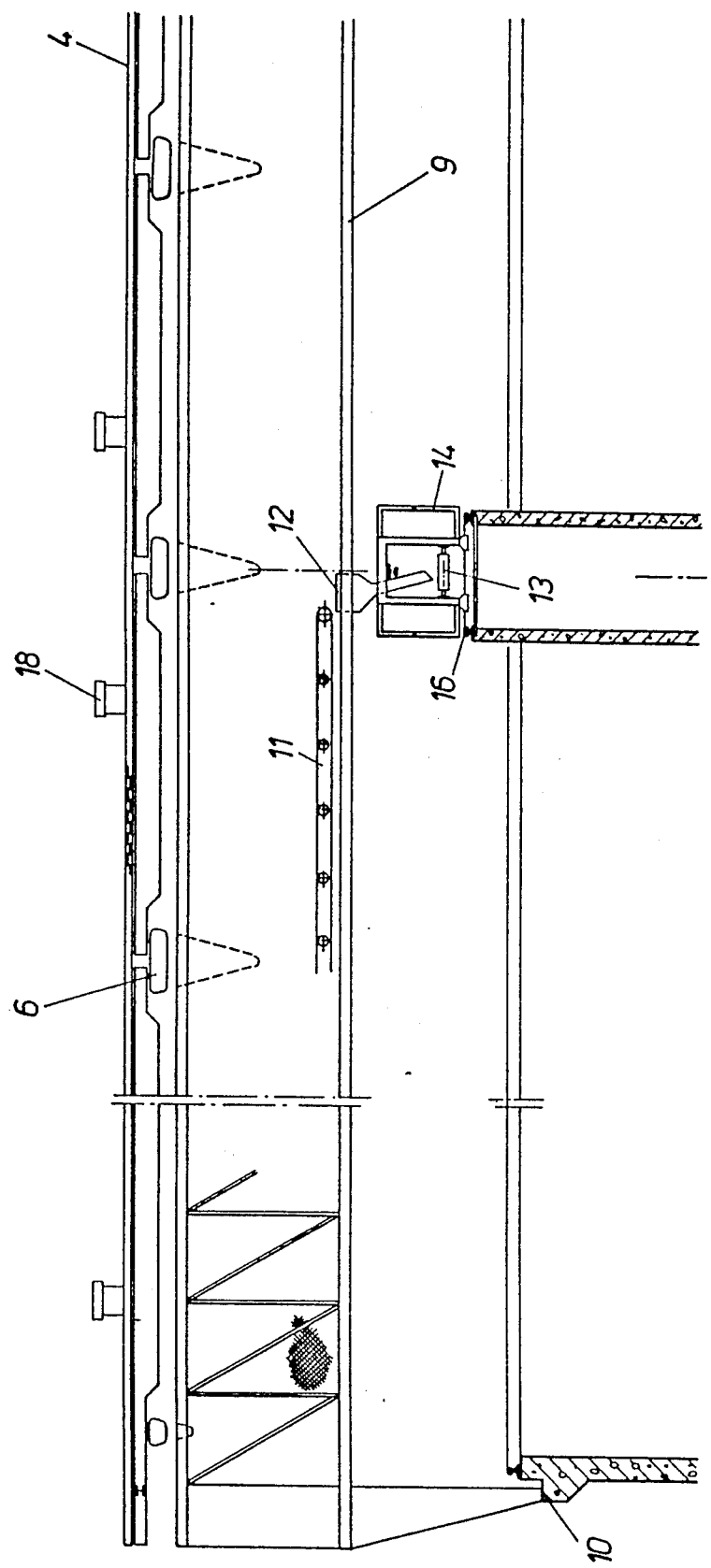
FIG. 2 is a partial longitudinal section through the main support of the roof with feeder belt.
Figure 3:
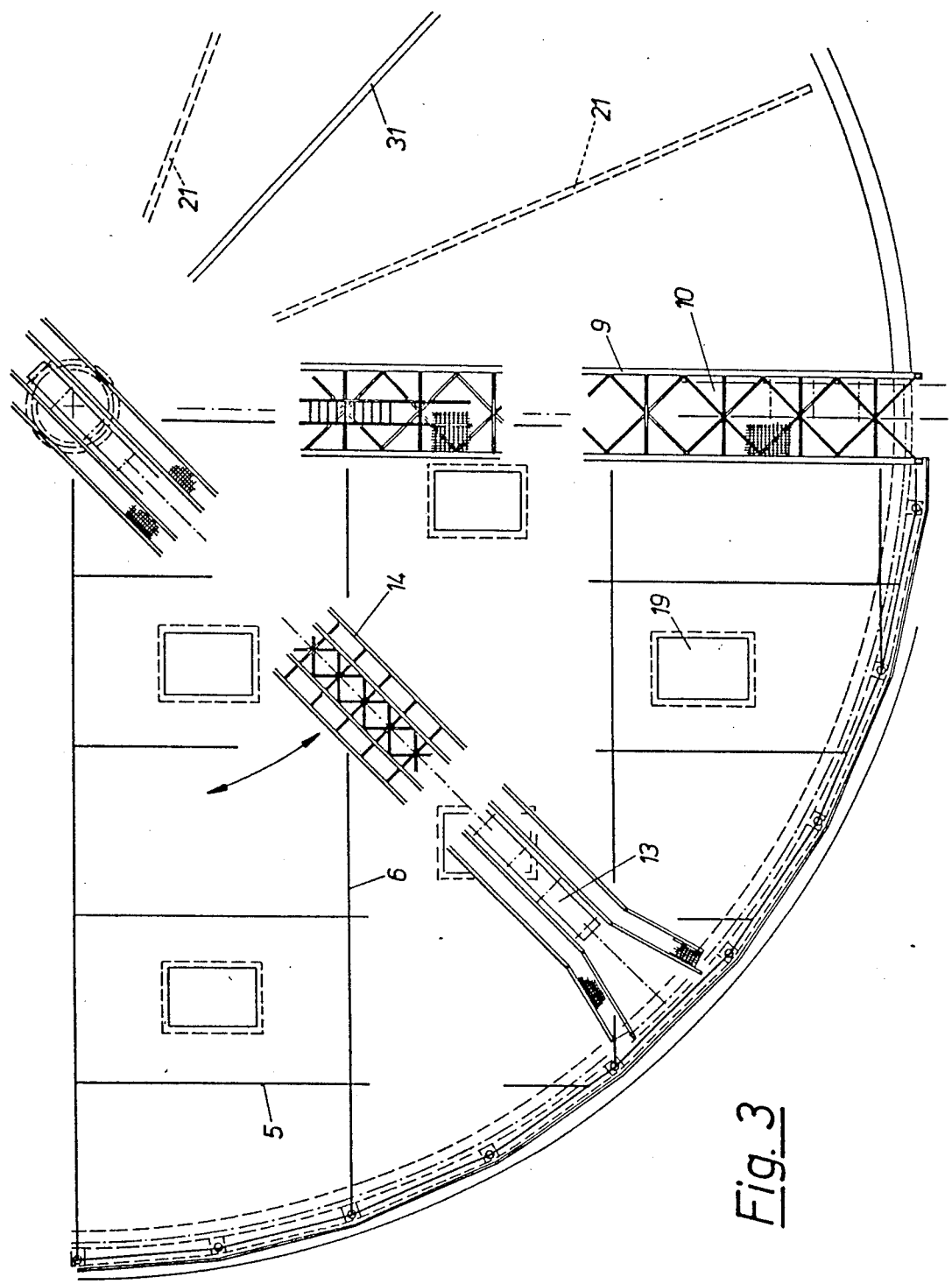
FIG. 3 represents a cut-out plan view of the container.

The underground (buried) container shown is a cylindrical container with a reinforced concrete casing 1 and a central mansized shaft 2 freely resting on a base (grown soil or gound table), so that yielding of the casing to the outside due to filling is possible. The bottom of the mansized shaft 2 and the bottom between mansized shaft 2 and casing 1 are covered with compensating concrete.

The container roof with integrated feeder and circular conveyor consists of a coating 4 supported by trusses 6 via purlins 5, the trusses 6 being supported on one end—at 8—on the casing 1 and on the other end—at 8—on a central box profile 9 which in turn is supported—at 10—on the casing 1. A feeder belt 11 conveying stockpile material from the outside to the central discharge hopper 12 runs within the box profile, and a folding ladder is provided on the underside of the profile.

Through the discharge hopper 12, the stockpile material is placed onto the discharge belt 13 of a circular conveyor 14 which is formed as a box profile circulating on a peripheral roll guide 15 on the casing 1 and a central roll guide 16 on the mansized shaft 2. An overhead (travelling) crane 17 travels on the carrying run of the box profile and the discharge belt is a tier belt so that the discharge of the stockpile material into the container can take place at any given location along the circular conveyor 14.

The roof coating 4 is provided with ventilation domes 18 and skylights 19 serving as explosion vanes.

Figure 4:
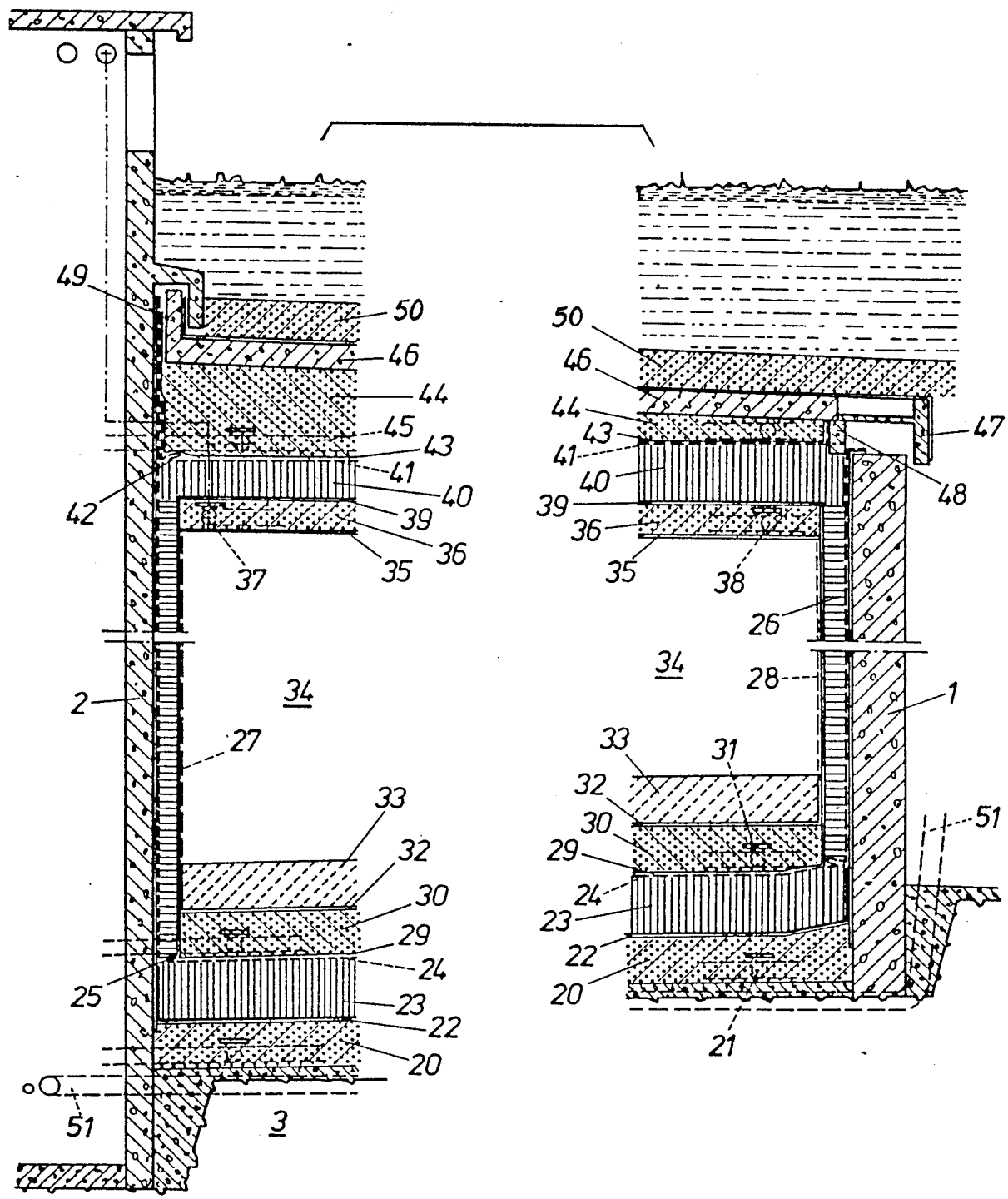
FIG. 4 a partial sectional view of the container in the filled and uncovered state.

Prior to introducing stockpile material into the container, a first surface filter layer 20, into which a star-shaped drainage pipe system 21 is inserted inclined towards the mansized shaft 2, is applied onto the compensating concrete between mansized shaft 2 and casing 1 whose surface slants towards the mansized shaft, for instance by an inclination of 4 percent. The surface filter layer is advantageously roof-shaped between the individual drainage pipes 21 so that it is highest in the middle between two adjacent drainage pipes and lowest in the area of the dainage pipes so that flat drainage surfaces, such as those known from EP-A No. 0130773, FIG. 4 and 5, are formed for a peripheral drainage with external annular pipeline.

But it is also possible to form a surface filter layer of essentially uniform thickness, with additional filling pipes (checking pipes) being provided on the surface of this layer.

The surface of the first surface filter layer is covered with a plastics net or non-woven material 22 permeable for liquid and gas onto which a first mineral sealing layer 23, in particular of argillaceous minerals, is applied, the plane surface of this layer also slanting towards the mansized shaft 2. The surface of the first mineral sealing layer 23 is covered by an HDPE sheet 24 of a thickness of about 33 mm or more impermeable for liquid and gas. The sheet 24 includes bottom/side sealing aprons that are pulled up abut the outer wall of the mansized shaft 2 and the inner wall of the casing 1. The sheet 24 has expanison folds 25 in the bottom-to-sidewall. A radial annular sealing layer 26, also preferably consisting of argillaceous minerals and secured towards the container interior by metallic supporting profiles is provided in the zones of the inner wall of the casing 1 and the outer wall of the mansized shaft 2, the central supporting profile being a corrugated copper sheet 27 and the radial supporting profile being a corrugated steel sheet 28.

The free surface portion of the first mineral sealing layer 23 is covered by a plastics net or non-woven material 29; and, a second mineral surface filter layer 30 with a second set of drainage pipes 31 is disposed on top of this.

The second surface filter layer 30 and the second set of drainage pipes 31 are formed and arranged identical to the first surface filter layer 20 and the first set of pipes 21, the second drainage pipes 31 possibly offset in vertical direction in relation to the first drainage pipes 21.

The supporting profiles 27 and 28 rest on the second surface filter layer 30 which is again covered by a plastics net or non-woven material 32 onto which a porous protective layer 33, in particular a bulk layer of sorted waste material, is applied.

The stockpile material is stored on this protective layer 33.

The second surface filter layer 30 with the set of drainage pipes 31 is used to collect and dispose of liquid discharged from the stored stockpile material body. Conveniently star-shaped or annular pipelines (not represented) may be provided in the second surface filter layer 30, conveniently on its surface, for supplying process gas to the stockpile material. The drainage pipes can optionally be used for supplying process gas to the stockpile material.

The first surface filter layer 20 with set of drainage pipes 21 serves for the collection and discharge of leakage penetrating downwards into the first surface filter layer on failure of the bottom/side sealing apron 24 and failure of the first mineral sealing layer 23. The individual drainage pipes 21 are individually monitored by measuring instruments (also optically or visually), so that a quick locating of leakage sites is possible. It is further possible to provide a compression/suction system (not represented) which makes it possible to subject individual ones or all of the drainage pipes 21 or 31 to negative pressure or superpressure or to prevent leakage locally by means of counterpressure in the first and/or in the second surface filter layer. This makes it possible, for instance, to relieve pressure on the base sealing, in particular on its sealing foil. The first surface filter layer 20 is conveniently provided in a manner known per se with injection pipes known per se by means of which a sealant can be introduced into the area of leakage sites.

The stockpile material 34, under or above which a thin covering layer of surface filter material could be introduced into the container, is evenly distributed in the conventional manner and optionally compacted and covered after reaching the top level mark by a plastics net or non-woven material 35 on top of which a third surface filter layer 36 incorporating a gas drainage pipe 37 and a liquid supply system 38 is disposed, so that it is not only possible to discharge gases forming in the stockpile material, for instance by sucking them off, but also to concertedly flush the stockpile material by means of liquids and/or gases by the cooperation of the pipe systems in the second surface filter layer 30 and third surface filter layer 36. The reference numbers are placed arbitrarily and do not indicate the position of the individual pipes. All pipe and conduit systems pass via the mansized shaft 2; and, the gas and/or liquid treatment means (not represented) for purification, valuable material recovery and/or metered addition of chemicals are arranged separately from the stockpipe material container and preferably above ground.

The third surface filter layer 36 is again covered by a plastics net or non-woven material 39 and a second mineral sealing layer 40 is placed on top of it, connecting the inner and outer annular sealing layer 26 to form a unit. The second mineral sealing layer 40 is dumped up to the upper edge of the casing 1 and formed with a surface sloping down to the mansized shaft 2 (inclination e.g. 1 percent).

A cover/side sealing apron 41 in the form of an HDPE sheet of e.g. 2 mm thickness is spread over this and pulled up on the outer wall of the mansized shaft abutting the bottom/side sealing apron 24 and is provided there in the transition zone from horizontal to vertical with a coverage compensating fold 42. The peripheral rim of the cover/side sealing apron is also pulled up, as will be described in detail.

A plastics net or non-woven material 43 is spread over the cover/side sealing apron and a fourth surface filter layer 44 with drainage pipes 45 is formed on top of this. The layer 44 drains into the mansized shaft 2 and its surface slopes down to the casing 1 (inclination e.g. 2 percent). The outer rim of the cover/side sealing apron 41 is pulled up over the outer rim of the fourth surface filter layer 44. Finally, a cover plate 46 projecting outwards beyond the casing 1 and slanting outwards is placed on top of the fourth surface filter layer 44. The plate 44 can be cast in situ with manhole covers, preferably in the form of adjacent individual segments, but it can also be formed of overlapping prefabricated segments which can be lifted off. The cover plate 46 is provided with an outer flange having two depending ribs of which the outer rib 47 overlaps the casing 1 and the inner rib 48 is formed so that it rests on the second mineral sealing layer 40 and can sealingly slide downwards with its outer surface on the bottom/side sealing apron 24 pulled up over the upper edge of the casing 1, while the pulled-up upper rim of the cover/side sealing apron 41 is sealingly held between the inner surface of the inner rib 48 and the fourth surface filter layer 44.

In this way, the cover plate 46, together with the third surface filter layer 36 and the fourth surface filter layer 44 and the second mineral sealing layer 40 disposed therebetween, can follow the volume shrinkage of the stockpile material during its storage and treatment in the container.

A corresponding guide for the cover plate, overlapping an upstanding flange 49 of the cover plate 46, is shown in the area of outer wall of the mansized shaft 2. The cover plate 46 is covered by a fifth surface filter layer 50 inclined outwards like the cover plate, this is topped by a conventional surface filling, which is conveniently covered by surface water binding growth.

A ventilation channel 51 and the current supply are passed into the mansized shaft 2 from the outside underneath the container bottom. It may be possible to pass all supply and discharge lines through the mansized shaft 2 which is appropriately covered after dismantling of the roof structure as shown in FIG. 1.

The surface of the cover plate 46 is insulated in a conventional manner, for instance by means of bitumen paint.

The first and second surface filter layers 20 and 30 have a thickness of e.g. 50 cm, the plastics nets or non-woven materials each have a specific surface weight of 750 g/m$^2$, the first mineral sealing layer has a thickness of 3×20 cm, the protective layer 30 has a thickness of 50 cm, the radial annular sealing layer has a thickness of 20 cm, the plastics nets or non-woven materials 35, 39 and 41 each have a specific surface weight of 200 g/m$^2$, the third surface filter layer 36 has a thickness of 30 cm, the second mineral sealing layer 40 has thicked of 40 to 46 cm, the fourth surface filter layer has a thickness of 100 cm on the outer wall of the mansized shaft and of 20 cm on the outer rim, the cover plate 46 has a thickness of 25 cm and the fourth surface filter layer 50 is 40 cm thick. The ground filling should consist of about 100 to 160 cm subsoil and about 15 cm humus on top of it. The surface filter layers are for instance gravel with a particle size distribution of 16 to 32 mm.

The various drainage and pipeline systems conventionally consist of noncorrosive pipes, e.g. of stoneware or metal. The diameter of the drainage pipes 21, 31 and 45 is for instance 200 mm.

In order to establish a permanent electrochemical diffusion flow, any given type of supporting profiles 27, 28 of metal can be inserted, providing that they are noncorrosive and that they occupy different positions in the electrochemical series and are thus capable of forming a primary element together. When applying separate excitation, the supporting profiles can be made of the same material. In some cases, it is envisaged to insert separately excited electrode lances into the stockpile material in order to make locally concentrated processes possible.

The invention is not limited to the exemplary embodiment shown. In a conventional manner, it is possible to provide containers which partially protrude from the ground or are built above ground.

It is further possible, for instance, to provide a bottom vat for the container, in particular of corrosion-proof steel or aluminum.

As a result of the free resting of the container casing on the base in the exemplary embodiment represented in cooperation with the particular sealing structure, the container casing can yeild laterally without impairment of its sealing properties.

In the foregoing context, liquids and/or gases are understood to include vapours and steam.

We claim:

1. A container for the long-term storage of stockpile material, comprising, an annular casing, a cover and a bottom which define a cavity for stockpile materials:
means for introducing stockpile materials centrally of the container;
a centrally located manshaft;
said bottom having a downward gradient toward the center of the container,
a first surface filter layer at the bottom of the container,
drainage pipes disposed in said first surface filter layer,
a first mineral sealing layer of argillaceous material on top of said first surface filter layer,
a bottom/side sealing apron with a lateral portion which tightly abuts the casing and the first mineral sealing layer,
a second surface filter layer which lies above the bottom/side sealing apron and also lies within the lateral portion of the bottom/side sealing apron,
said container having drainage pipes in said second surface filter layer.

2. A container according to claim 1 having a radial mineral sealing layer of annular shape located between the second surface filter layer and the bottom/side sealing apron.

3. A container according to claim 1 wherein the bottom/side sealing apron is made of an elastic material and has a bottom-to-side transition area which has an expression compensation zone.

4. A container according to claim 1 having a supporting layer of sheet material which is permeable to gases and liquids, said supporting layer lying between the first surface filter layer and the first mineral sealing layer.

5. A container according to claim 1 having a supporting layer of sheet material which is permeable to gases and liquids, said supporting layer lying between the bottom/side sealing apron and the second surface filter layer.

6. A container according to claim 1 having a porous protective layer between stockpile material in the cavity and the second surface filter layer, a supporting layer of sheet material which is permeable to gases and liquids, said supporting layer lying between the second surface filter layer and the porous protective layer.

7. A container according to claim 1 having a third surface filter layer means for covering stockpile material in the cavity, drainage pipes provided in said third surface filter layer, and another mineral sealing layer of argillaceous material disposed on top of the third surface filter layer.

8. A container according to claim 7 wherein the top of the second mineral sealing layer is covered by a fourth surface filter layer provided with drainage pipes that slope down to the center of container.

9. A container according to claim 8 wherein the cover is a plate, and the top of the fourth surface filter layer is covered by the cover plate, said cover plate overlapping the casing and sloping downwardly to the center of the container.

10. A container according to claim 9 wherein the cover plate is movable relative to the casing to adapt itself to volumetric changes of stockpile material in the cavity.

11. A container according to claim 10 having a bottom/side sealing apron, and wherein the cover plate has an inner rim which rests on the second mineral sealing layer and sealingly slides along the bottom/side sealing apron.

12. A container according to claim 10 having a cover/side sealing apron on the fourth surface filter layer, said cover/side sealing apron having an upturned portion and being located between the second mineral sealing layer and the fourth surface filter layer.

13. A container according to claim 12 wherein the cover plate has an inner rim which is sealed to an upturned portion of the cover/side sealing apron.

14. A container according to claim 1 wherein at least one of the surface filter layers slopes down to the container center.

15. The container according to claim 1 wherein the container is underground, and a further surface filter layer is provided on top of the cover plate.

16. A container according to claim 2 having, a supporting member formed of steel and a supporting member formed of copper, said supporting members being located on opposite sides of the stockpile material.

17. A container according to claim 1 having means for introducing a fluid medium into at least one of the surface filter layers.

18. A container according to claim 1 having means for withdrawing a fluid medium from at least one of the surface filter layers.

* * * * *